United States Patent
Struhl

(10) Patent No.: US 11,771,064 B2
(45) Date of Patent: Oct. 3, 2023

(54) UNIVERSAL INNER COVER FOR A BEEHIVE

(71) Applicant: Clifford Struhl, Garden City Park, NY (US)

(72) Inventor: Clifford Struhl, Garden City Park, NY (US)

(*) Notice: Subject to any disclaimer, the term of this patent is extended or adjusted under 35 U.S.C. 154(b) by 22 days.

(21) Appl. No.: 17/527,763

(22) Filed: Nov. 16, 2021

(65) Prior Publication Data

US 2022/0183260 A1 Jun. 16, 2022

Related U.S. Application Data

(60) Provisional application No. 63/125,492, filed on Dec. 15, 2020.

(51) Int. Cl.
*A01K 47/06* (2006.01)

(52) U.S. Cl.
CPC .................................... *A01K 47/06* (2013.01)

(58) Field of Classification Search
CPC .... A01K 47/00; A01K 47/06; B65D 43/0216; B65D 43/0214; B65D 2543/00546
See application file for complete search history.

(56) References Cited

U.S. PATENT DOCUMENTS

| | | | | |
|---|---|---|---|---|
| 199,005 A * | 1/1878 | Wageoner | ............... | A01K 47/00 449/34 |
| 383,737 A * | 5/1888 | Laser | ..................... | A01K 47/00 449/32 |
| 2,513,709 A * | 7/1950 | Blackwell | .......... | B65D 21/0213 |
| 3,934,724 A * | 1/1976 | Johnson | .................. | A01K 53/00 |
| 3,968,531 A * | 7/1976 | Cartwright | ............. | A01K 47/00 449/30 |
| 4,135,265 A * | 1/1979 | Van de Kerkof | ...... | A01K 47/00 449/9 |
| 5,033,243 A * | 7/1991 | Worms | ................. | A01K 67/033 52/80.1 |
| 8,764,512 B1 * | 7/2014 | Watson | ................... | A01K 53/00 449/20 |
| 10,321,667 B2 | 6/2019 | Jackson | | |
| 2015/0021322 A1 * | 1/2015 | Rosenblum | .......... | B65D 5/4229 206/508 |
| 2016/0212976 A1 * | 7/2016 | Bulanyy | .................... | A01K 47/06 |
| 2017/0354127 A1 * | 12/2017 | Woods | .................... | A01K 53/00 |
| 2020/0267946 A1 | 8/2020 | Struhl et al. | | |
| 2022/0081158 A1 * | 3/2022 | Banik | ..................... | B65D 19/04 |

FOREIGN PATENT DOCUMENTS

| | | | | | |
|---|---|---|---|---|---|
| CN | 204119987 U | * | 1/2015 | ............. | A01K 47/00 |
| CN | 106359174 A | * | 2/2017 | ............. | A01K 47/00 |

* cited by examiner

*Primary Examiner* — Peter M Poon
*Assistant Examiner* — Carly W. Lynch
(74) *Attorney, Agent, or Firm* — Dilworth & Barrese, LLP.; Michael J. Musella, Esq.

(57) ABSTRACT

There is provided herein an universal inner cover for a beehive which has a plate having a perimeter, and an upper surface and an opposing lower surface; and, a housing which is disposed on the upper surface of the plate having a perimeter which is smaller than the perimeter of the plate and which has four interconnected side sidewalls which are orthogonal to the upper surface of the plate. The plate's upper surface can be convex and the opposing lower surface can be convex. The housing can have a layer of insulation disposed therein, which can optionally contain cut-outs to hold various components for beehives.

20 Claims, 7 Drawing Sheets

UNIVERSAL INNER COVER FOR A BEEHIVE

CROSS-REFERENCE TO RELATED APPLICATIONS

This application claims priority to U.S. Provisional Patent Application No. 63/125,492 filed on Dec. 15, 2020, the entire contents of which are incorporated herein by reference in their entirety.

TECHNICAL FIELD

The present disclosure relates generally to an inner cover for a beehive and components thereof, and more particularly, to an insulated inner cover for a beehive configured to provide a uniform hive environment.

BACKGROUND OF THE INVENTION

Inner covers are an essential component in bee hives that utilize telescoping covers and act as an intermediary between the top hive box and the outside cover. Traditionally these are made from wood with a center hole and sometimes a notch on the outer edge to act as an upper entrance for bees. These common inner covers offer no protection from extremes in temperature or changes in temperature during the year. A continuing issue is that these common inner covers transmit heat into the hive by conduction from the outer cover during the summer and allow heat to escape during the winter, resulting in the bees having to work hard to maintain an uniform hive environment with regard to temperature and humidity, both throughout the day and from season to season.

Accordingly, it is desirable to provide an improved inner cover for a beehive that overcomes deficiencies in the prior art.

SUMMARY OF THE INVENTION

Generally speaking, in accordance with the invention, an improved inner cover for a beehive is provided.

The inner cover of the present invention is based on the principals of Darwinian beekeeping, which entails, among other aspects, that by keeping hives cooler in the summer months and warmer in the winter months this provides for a more controlled and natural environment. This controlled temperature environment allows for less stressed and healthier bees that produce more honey and overwinter more successfully.

The inner cover as described herein is compatible with either 8-frame or 10-frame hive boxes, supports additional hive boxes or a feeder on top, and can be combined with any 10-frame conventional telescoping cover. It is made of virtually indestructible materials, which are resistant to sticking from propolis, will not rot, never needs painting, and is manufactured in a ready to use manner. In the summer, there is an option for additional ventilation to control moisture during the nectar/honey flow and in the winter, it offers the possibility of employing a feeder and/or an upper entrance and/or a sealed top.

As will be described hereinbelow, the universal inner cover provides for an insulation insert that is designed to fit snugly together with the inner cover to create a sealed unit. In addition, by molding the insulation, a skin is provided on the surface of the insulation which avoids the problem of the bees chewing on the insulation, which is a problem that can occur with conventional insulation boards.

In addition, by employing a domed inner surface in the insulated cover, there is provided a space for the bees to move freely under the cover between the bottom of the cover and the top of any underlying hive frames, and also such a space provides for the potential inclusion of a feeder device therein, or any other suitable beehive component. In addition, such a space assists in directing any condensation to the outside edge so that there is no moisture dripping on the bees.

In one embodiment of the invention there is provided an universal inner cover for a beehive which comprises a domed plate having a perimeter and an upper convex surface and an opposing lower concave surface; and, a housing disposed on the upper convex surface of the plate having a perimeter which is smaller than the perimeter of the plate and which has four interconnected side walls which are orthogonal to the upper surface of the plate.

In one other embodiment of the invention there is provided an universal inner cover for a beehive which comprises a plate having a perimeter and an upper surface and an opposing lower surface; a housing disposed on the upper surface of the plate having a perimeter which is smaller than the perimeter of the plate and which has four interconnected side walls which are orthogonal to the upper surface of the plate; and, a layer of insulation which at least substantially occupies an area within the perimeter of the housing.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which.

Throughout the disclosure, like reference numerals will be used to indicate similar elements.

DETAILED DESCRIPTION

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

The insulated inner cover according to the present disclosure will now be described with respect to the drawings.

Figure 1:
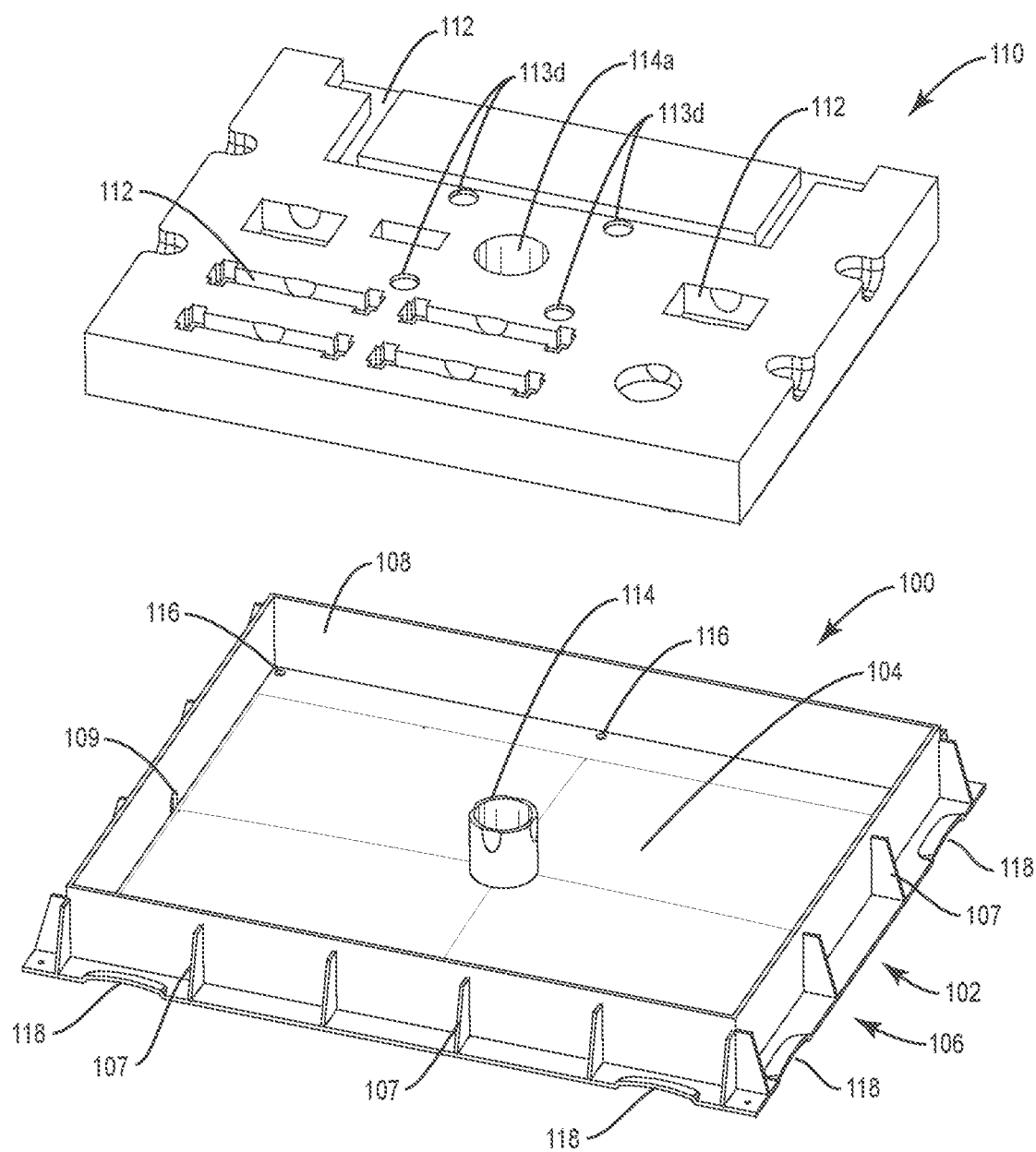
FIGS. 1-7 illustrate various embodiments of an inner cover for a beehive according to the present disclosure.
Figure 2:
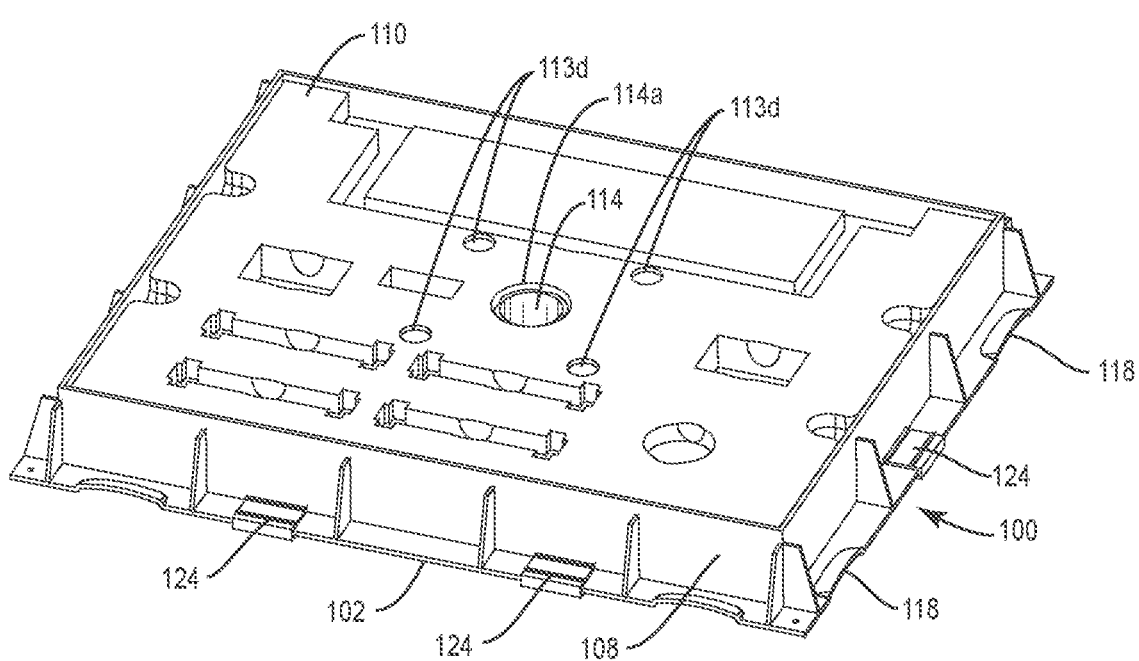
Figure 3:
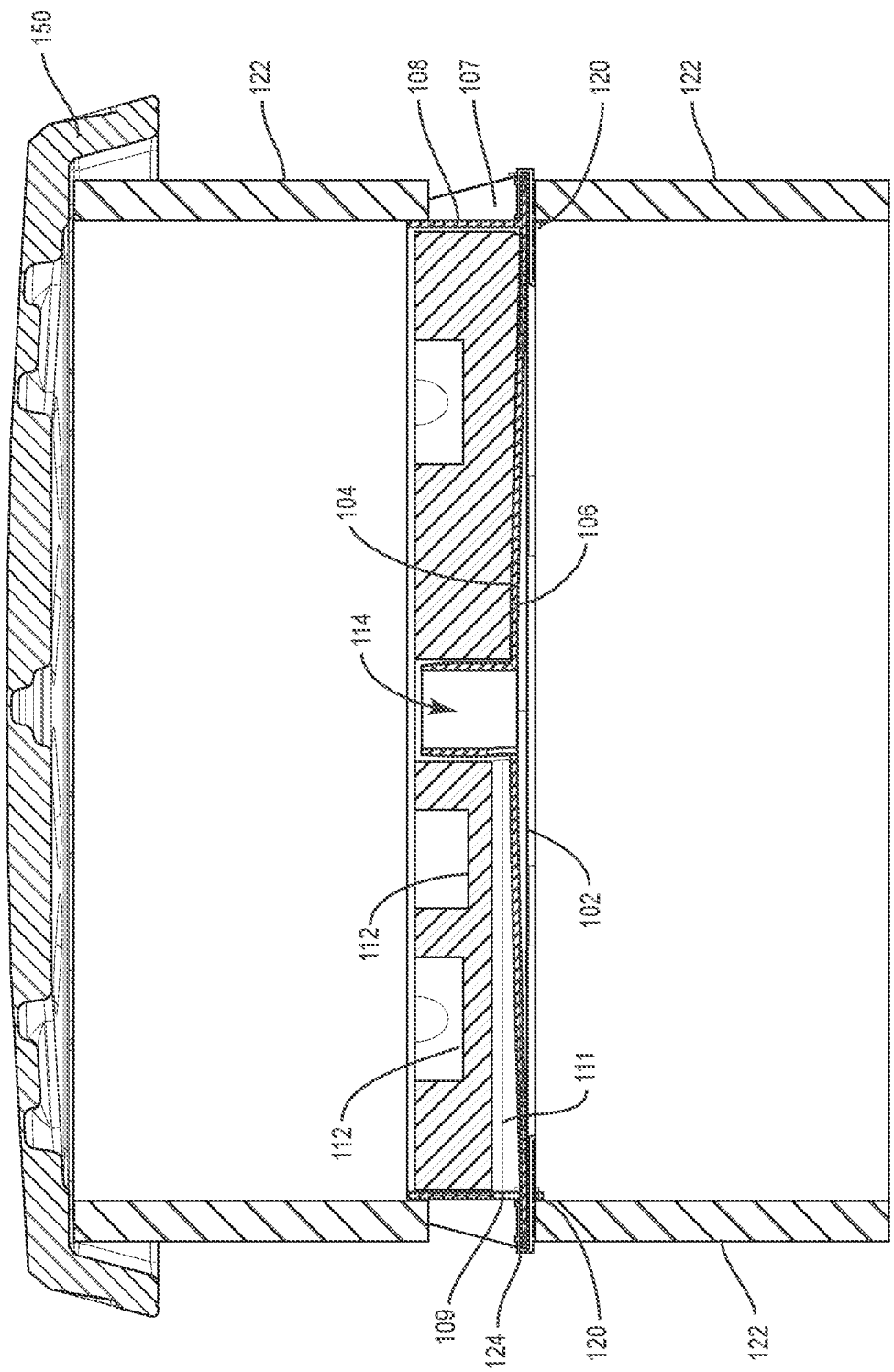

FIG. 1 illustrates an embodiment of a universal inner cover 100 of the present invention in a perspective view, with a layer of insulation 110 there above, and in FIG. 2, the layer of insulation 110 is inserted in the universal inner cover 100. FIG. 3 illustrates a universal inner cover 100 in a cross-sectional side views of the universal inner cover 100 showing the domed plate 102 having the upper convex surface 104 and lower concave surface 106. The domed plate 102 having the upper convex surface 104 and the lower concave surface 106 provides for moisture and condensation to avoid dripping on the bees in an underlying hive box (not shown) which can provide for less stressed bees and leads to Darwinian beekeeping conditions. By use of the universal inner cover 100 herein, the condensation can be kept on the outer walls of the cover 100 and the beehive overall. The domed inner surface directs any condensation to the outer edges so there is no dripping on the bees. The universal inner cover 100 can be made of any suitable material, but preferably is made of a polymer material, more preferably a molded polymer material such as a Technopolymer construction and will not rot or decay like wood. Preferably the material used to make the universal inner cover 100 is recyclable. The universal inner cover 100 does not require any assembly and is ready to use.

While the domed plate 102 is shown herein as having an upper convex surface 104 and a lower concave surface 106, the domed plate 102 can in one embodiment herein be in the absence of any doming and the embodiments described herein can be used in kind with just such a plate 102 and the use of the term domed plate 102 and the term plate 102 can be used to reflect these different embodiments, i.e., a plate with doming and a plate without doming.

The domed plate 102 can have the upper convex surface 104 can extend substantially across the domed plate 102, but in some embodiments can extend across the entire domed plate 102 or alternatively in a lesser degree across the domed plate 102. The lower concave surface 106 can mirror the extent of the upper convex surface 104 substantially, but variations are envisioned. The domed plate 102 has a perimeter that can encompass any suitable shape but, in many instances, can be a rectangle or square, such as those which would accommodate an overlying and/or underlying hive box, such as either of an 8-frame or 10-frame hive box.

The housing 108 shown in FIGS. 1 and 2, provides for the support of any upper hive box which can include a feeder, or other suitable optional access points for the bees at various times of the year which facilitate the universal use of the inner cover 100. The housing 108 is disposed on the upper convex surface 104 and generally has a perimeter which is smaller than the perimeter of the domed plate 102, but is substantially close to the perimeter of the upper plate, such that the housing 108 is close to the sides of the perimeter of the domed plate 102. The housing 108 can also work well and is useable with a further cover 150 thereover such as is shown in FIGS. 3 and 5-7. The housing 108 can be made from four interconnected side walls which are orthogonal (i.e., at right angles to) the domed plate 102, although other configurations of the placement of the side walls in envisioned. In one embodiment, the housing 108 can contain an access hole 109 for the bees to enter during desired seasonal changes; see in this regard FIGS. 3, 4 and 7. Such an access hole 109 is part of a tunnel 111 which may be used by bees following entrance into access hole 109 to access the aperture 114, as is described herein below; see FIGS. 3 and 4.

Figure 4:
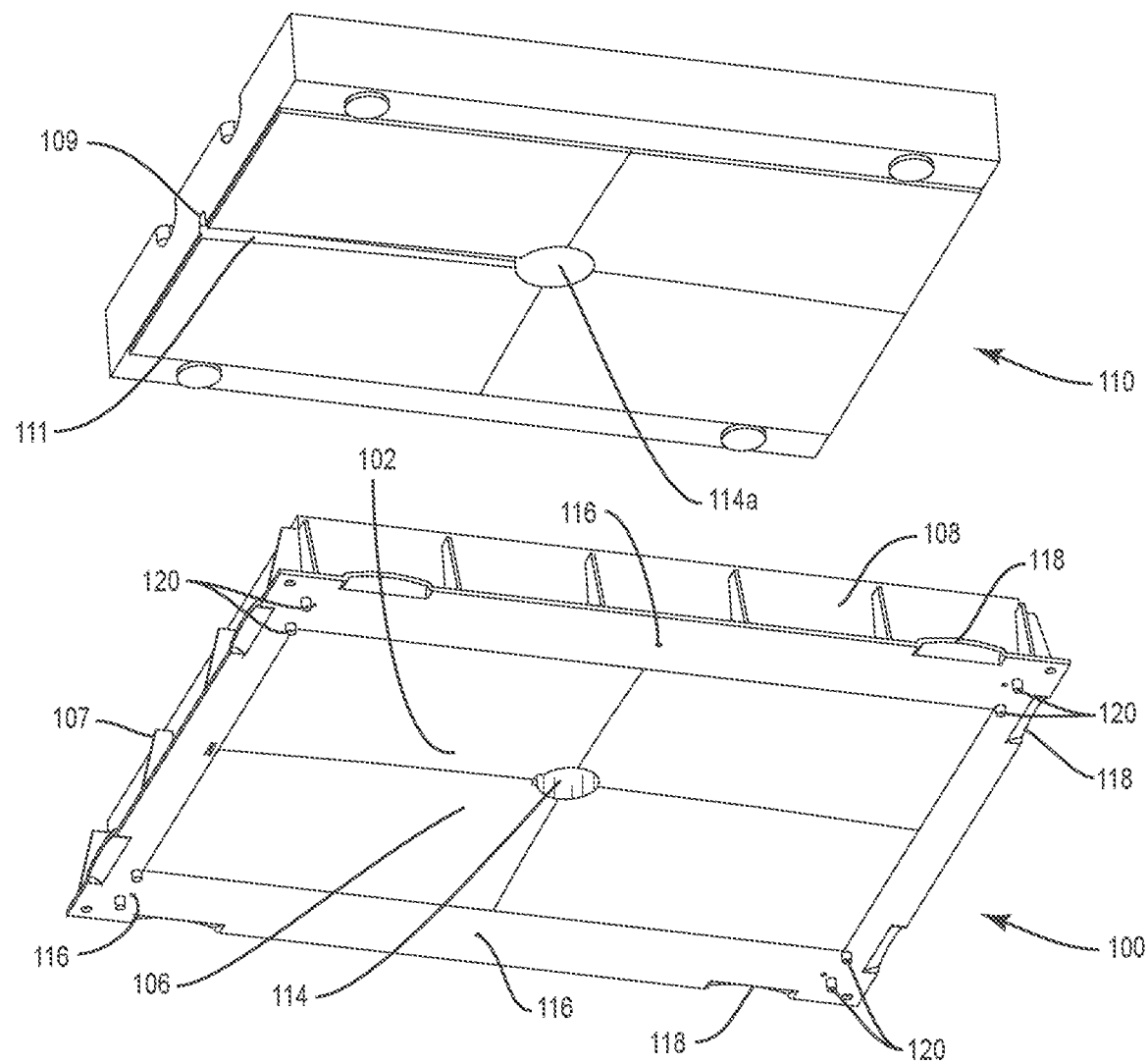

FIGS. 2 and 3 illustrates the use of a layer of insulation 110 which can be placed within the perimeter of the housing 108. The insulation 110 provides for further improvements in the hive by being able to prevent loss of heat in the underlying hive in the winter and maintenance of the temperature in the hive during the summer months to further facilitate the Darwinian conditions for the hive so that the bees need to do less cooling. The insulation 110 can have cut outs 112 which can store various tools and components for beekeeping, such as the ventilation clips discussed herein and other known beekeeping tools and components. Preferably the insulation 110 substantially occupies an area within the perimeter of the housing 108, and more preferably fits snugly in the perimeter of the housing 108, although a layer of insulation 110 which occupies less than the entire perimeter of the housing 108 is contemplated. The insulation layer 110 can ideally be made from a molded foam material which provides for a skin that is formed on the surface of the insulation layer 110. The skin layer of the insulation 110 can prevent the bees from contacting and/or chewing on the insulation layer 110. The insulation layer can be any of any suitable foam type conventional insulation which is in board form. In one embodiment, the insulation layer 110 has a tunnel 111 formed on a side opposite the side containing the cutouts 112, which tunnel 111 is in line with the access hole 109 in the housing 108 so that bees upon entering through the access hole 109 can employ the tunnel 111 to access the aperture 114, and/or, access any underlying hive box(es), and/or underlying hive frame(s). Such a tunnel 111 in the bottom of insulation layer 111 is seen in FIGS. 3 and 4.

The domed plate 102 can contain an aperture 114 therethrough which extends entirely through the domed plate 102. The aperture 114 can provide ventilation to an underlying hive box(es) and can provide an access point for bees in a hive to a feeder or other component above the hive. The aperture 114 can be located anywhere on the domed plate 102, but preferably is substantially centrally located on the domed plate, which facilitates access for the bees from any underlying hive box(es) to a feeder which may be located over the cover 100 or any other suitable desirable beekeeping component or device located in an overlying hive box. The aperture 114 is preferably a hollow cylindrical tube extending from up above the upper convex surface 104 of the domed plate 102, and such a tube can have the insulation layer 110 therearound, which prevents the bees from contacting and/or accessing the insulation layer 110. The insulation layer 110 can contain a cut-out opening 114a, which can accommodate the tube making up aperture 114 as shown in FIGS. 1 and 2. Thus, the aperture 114 which is formed by the tube can be far enough above the domed plate 102 so as to accommodate a suitable thickness of the insulation layer 110 being fitted therein around said aperture 114 so as to provide insulation to the tube as well as the domed plate 102. FIGS. 1-5 also illustrate various angles wherein the aperture 114 is visible. The aperture 114 can be of any suitable size, but can preferably be from ½ inch to 3 inches, preferably from 1 inch to 2 inches and most preferably about 1.5 inches is diameter. In one embodiment, the aperture 114 can be capped during desirable periods such as the winter months or when a feeder is not attached. The insulation opening 114a can be of the same size and shape as 114 provided it is slightly larger then 114 so as to accommodate the tube of 114.

Referring again to FIG. 1 there is provided in the domed plate 102, holes 116, which are weep holes which can facilitate the dripping of any condensation away from the center area of the domed plate 102 and the center area of the underling lower concave surface 106 so as to avoid the condensation from dripping on the bees in an underlying hive box. Such weep holes 116 can be provide anywhere along the substantial interior of the perimeter of the housing 108 in the domed plate 102. The housing 108 also contains support ribs 107 which can line the outer sides of the housing 108 and be placed at right angles to the domed plate 102 and against the sides of the housing 108 to provide support for the housing 108 sides and also to provide an optional point of support for an overlying component such as a further hive box, either 8-frame or 10-frame and/or a feeder apparatus; see in this regard FIGS. 3, 6 and 7. Such ribs 107 can also support and/or fit a standard outer hive cover 150 thereover, such as an entire standard outer hive cover 150, and the ribs 107 do not interfere with the placement of such an outer cover over the entire hive (not shown). In one embodiment herein, the ribs 107 by their placement and shape can also act to center the outer cover 150 on the inner cover 100.

Referring to FIGS. 1, 2, 4 and 6-8, the domed plate 102 can also contain access slots 118 which can be used for access by hive access tools such as those known in the art. The domed plate 102 can have at least one access slot 118 along the perimeter of the domed plate 102, and preferably, the domed plate 102 has two access slots 118 along each of the edges of the perimeter of the domed plate 102 such that each corner of the domed plate 102 has two access slots 118 substantially close thereto, such as one access slot on each of the opposing edges of each corner of the domed plate 102.

Figure 7:
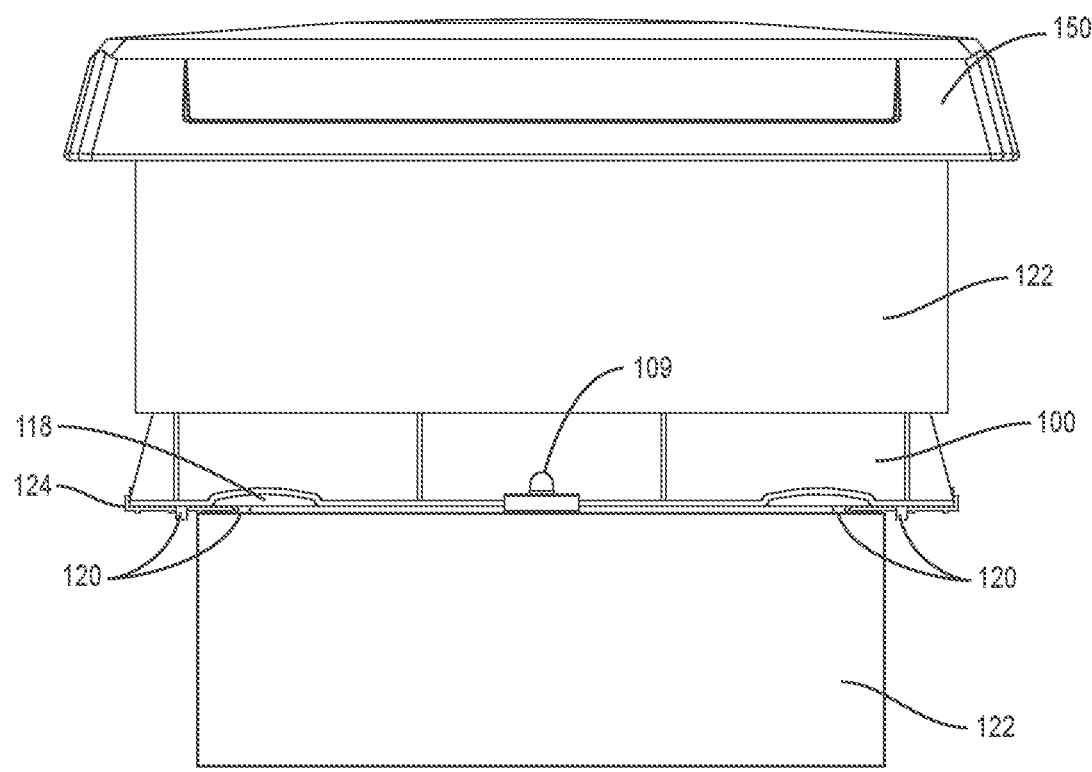

Referring now to FIGS. 3, 4 and 7, the universal inner cover 100 herein can advantageously contain alignment pins 120 on the bottom of the domed plate 102 to prevent movement of the universal inner cover 100. Preferably the universal inner cover 100 contains at least two alignment pins 120 which are disposed substantially proximate to every corner, such that the alignment pins can support the cover over either an 8-frame or 10-frame hive box, and can prevent movement of the cover 100. In one embodiment the alignment pins 120 are linearly spaced apart and there are two such alignment pins 120 at every corner.

Figure 5:
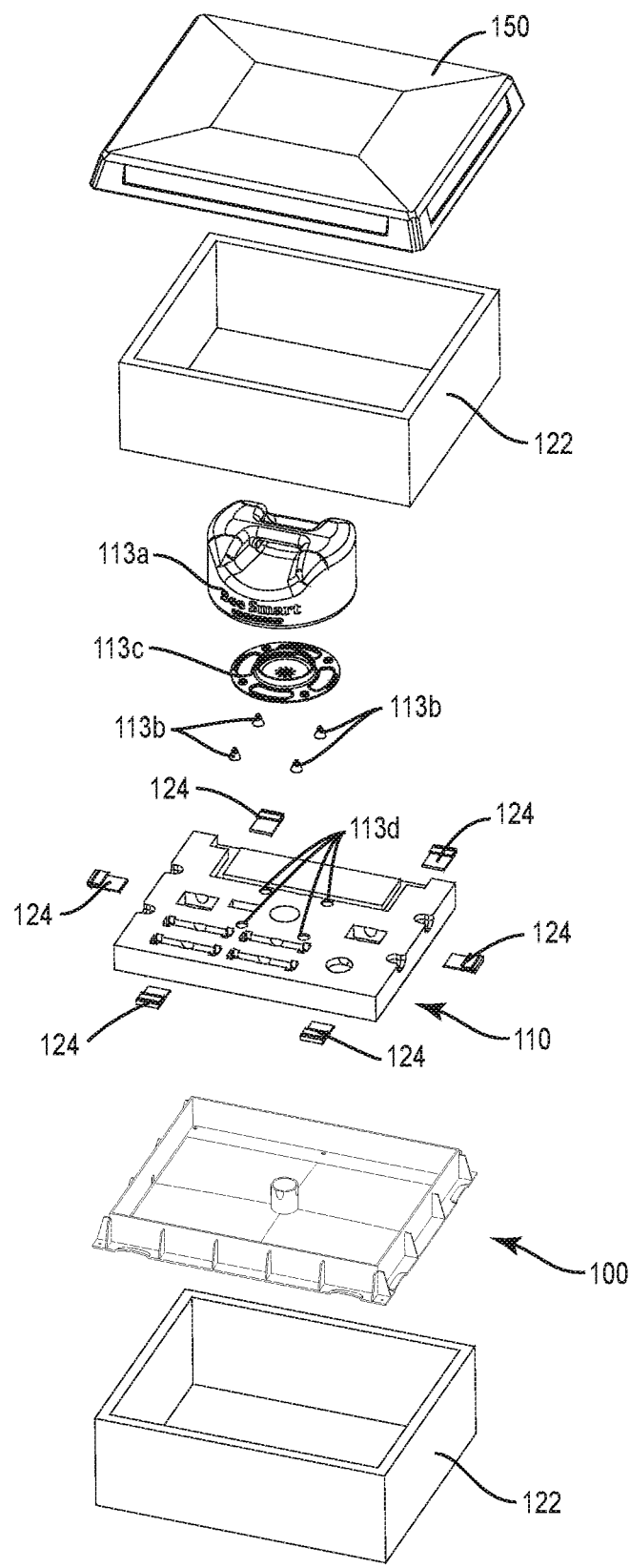

Referring to FIGS. 3 and 5-7, the universal inner cover 100 with the insulation layer 110, or alternatively, without, can be disposed on top of a hive box 122, such as an 8-frame or 10-frame hive box. In addition, optionally the universal inner cover 100 can be overlaid with a separate hive box 122 which can include a feeder 113a, such as a feeder which is disclosed in U.S. patent application Ser. No. 16/783,669 filed on Feb. 6, 2020, the entire contents of which are incorporated by reference herein. Such feeder 113a can be supported by feeder feet 113b and can be attached to the insulation 111 by a feeder cap 113c. The feeder feet 113b can each be supported in the insulation layer 111 by a suitable respective indentation 113d in the insulation layer 111 as shown in FIG. 5.

Referring to FIGS. 3 and 5-7, the universal inner cover 100 can have vent clips 124 disposed along the perimeter edge of the domed plate 102. The vent clips 124 provide for a spacing between the universal cover 100 and any underlying hive box 122 as best seen in FIG. 3. The spacing provides for ventilation to the hive which facilitates the reduction of heat in the summer and reduces the heat stress on the bees. The vent clips 124 can be located on the substantially middle sections of every edge of the perimeter of the domed plate 102. The vent clips 124 can have protrusions on the underside of the clip which assist in securing the universal inner cover to an underlying hive box 122 and also which can be increased or decreased to suitable size to provide more or less space for ventilation as desired.

Figure 6:
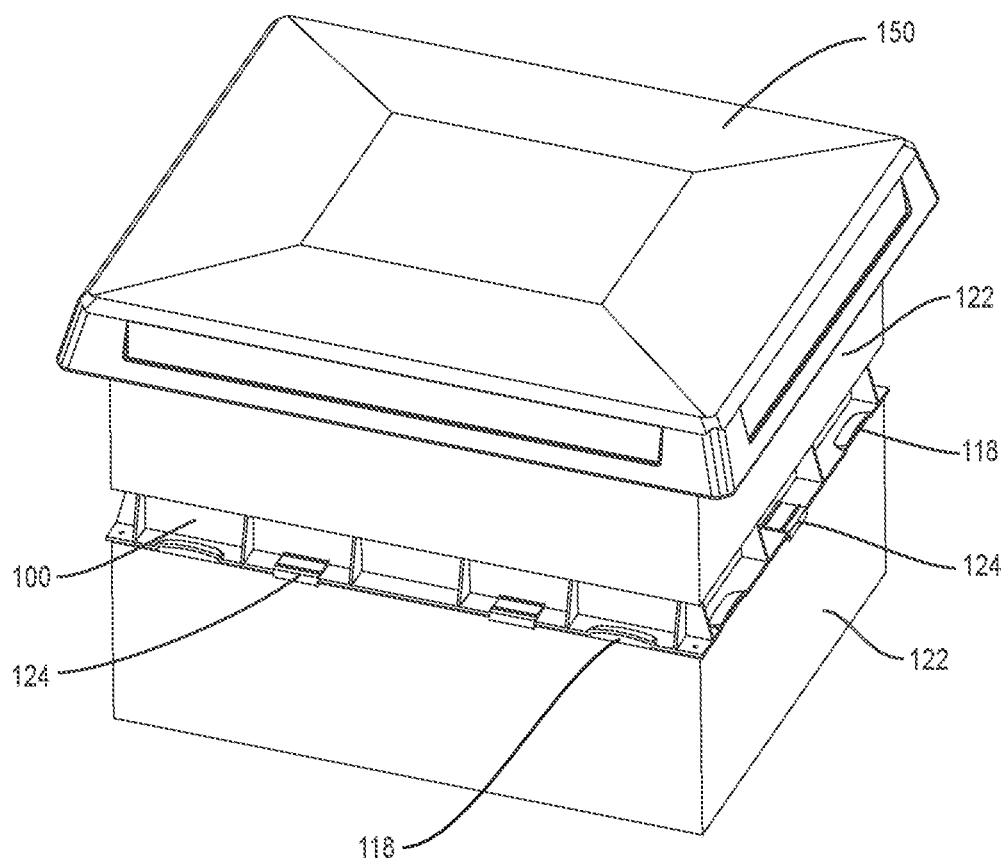

In one embodiment the universal cover 100 can have a 10-frame hive box 122 underneath the cover 100 and above the cover as shown in FIGS. 3, 5 and 6. In another embodiment, the universal cover 100 can be have an 8-frame hive box 122 underneath the cover and a 10-frame hive box 122 over the universal cover 100 as shown in FIG. 7.

Components of the system can be fabricated from materials suitable for outdoor environments, including, but not limited to, metal(s), plastic(s), wood(s), combinations thereof, etc. Various components of the system may be fabricated from material composites, including the above materials, to achieve various desired characteristics such as strength, rigidity, elasticity, flexibility, compliance, performance, and durability. The components of the system, individually or collectively, may also be fabricated from a heterogeneous material such as a combination of two or more of the above-described materials.

Where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims.

While the embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A universal inner cover for a beehive, comprising:
   a domed plate having a perimeter and an upper convex surface and an opposing lower concave surface; and
   a housing disposed on the upper convex surface of the domed plate having a perimeter which is smaller than the entire perimeter of the domed plate and four interconnected side walls which are orthogonal to the upper convex surface of the domed plate and mounted upon the upper convex surface of the domed plate such that each said side wall is spaced inwardly from an adjacent edge of the upper convex surface of the domed plate.

2. The universal inner cover of claim 1, wherein the housing has disposed therein a layer of insulation which at least substantially occupies an area within the perimeter of the housing.

3. The universal inner cover of claim 1, wherein the domed plate contains an aperture extending entirely through the domed plate and comprising a hollow cylindrical tube extending above the upper convex surface of the domed plate.

4. The universal cover of claim 3, wherein the aperture is substantially centrally located on the domed plate.

5. The universal inner cover of claim 1, wherein the domed plate contains holes therethrough located along an interior area of the perimeter of the housing.

6. The universal inner cover of claim 1, wherein the housing has a series of support ribs disposed on external surfaces of the side walls.

7. The universal inner cover of claim 1, wherein the domed plate contains at least one access slot along the perimeter thereof.

8. The universal inner cover of claim 7, wherein the domed plate has four perimeter edges which form four corners, and wherein there are at least two access slots located along each perimeter edge such that there is one access slot on each opposing edge of each corner and substantially proximate to each corner.

9. The universal inner cover of claim 1, wherein the domed plate has four perimeter edges which form four corners, and a bottom of the domed plate has at least two spaced apart alignment pins disposed substantially proximate every corner.

10. A beehive comprising a frame beehive box and, the universal inner cover of claim 1 disposed on a top of the frame beehive box.

11. The beehive of claim 10, having vent clips disposed along the perimeter of the domed plate.

12. A universal inner cover for a beehive, comprising:
a plate having a perimeter and an upper surface and an opposing lower surface;
a housing disposed on the upper surface of the plate having a perimeter which is smaller than the entire perimeter of the plate and four interconnected side walls which are orthogonal to the upper surface of the plate and mounted upon the upper surface of the plate such that each said side wall is spaced inwardly from an adjacent edge of the upper surface of the plate; and
a layer of insulation which at least substantially occupies an area within the perimeter of the housing.

13. The universal inner cover of claim 12, wherein an upper surface of the layer of insulation has cut-outs shaped to accommodate beehive components.

14. The universal inner cover of claim 12, having an aperture extending entirely through both the plate and the layer of insulation and comprising a hollow cylindrical tube mounted upon and extending above the upper surface of the plate.

15. The universal cover of claim 14, wherein one of said side walls has an unobstructed, open access hole and said insulation layer comprises a tunnel formed along one side thereof and aligned with the access hole, to provide access for bees into the beehive through the aperture extending normally to the tunnel.

16. The universal inner cover of claim 14, wherein the aperture is substantially centrally located on the plate and through the layer of insulation.

17. The universal inner cover of claim 12, wherein the plate contains holes therethrough located along an interior area of the perimeter of the housing.

18. The universal inner cover of claim 12, wherein the housing has a series of support ribs disposed on external surfaces of the side walls.

19. The universal inner cover of claim 12, wherein the plate contains at least one access slot along the perimeter thereof.

20. The universal cover of claim 12, wherein one of said side walls has an unobstructed, open access hole and said insulation layer comprises a tunnel formed along one side thereof and aligned with the access hole, to provide access for bees into the beehive.

* * * * *